(12) United States Patent
Leiva et al.

(10) Patent No.: US 10,967,961 B2
(45) Date of Patent: Apr. 6, 2021

(54) LAMINATED DIMPLED FOIL METALLIC HEAT SHIELD

(71) Applicant: Goodrich Corporation, Charlotte, NC (US)

(72) Inventors: Orly Leiva, Miamisburg, OH (US); Robert L Phillis, Covington, OH (US); Regan A Oswalt, Springfield, OH (US)

(73) Assignee: Goodrich Corporation, Charlotte, NC (US)

(*) Notice: Subject to any disclaimer, the term of this patent is extended or adjusted under 35 U.S.C. 154(b) by 407 days.

(21) Appl. No.: 15/887,590

(22) Filed: Feb. 2, 2018

(65) Prior Publication Data

US 2019/0241257 A1    Aug. 8, 2019

(51) Int. Cl.
| | |
|---|---|
| *F16D 65/78* | (2006.01) |
| *B64C 25/42* | (2006.01) |
| *F16D 55/36* | (2006.01) |
| *B60T 8/17* | (2006.01) |
| *B32B 15/01* | (2006.01) |
| *B32B 37/14* | (2006.01) |
| *B64C 25/34* | (2006.01) |
| *F16D 65/18* | (2006.01) |
| *F16D 65/847* | (2006.01) |

(52) U.S. Cl.
CPC ............. *B64C 25/42* (2013.01); *B32B 15/01* (2013.01); *B32B 37/14* (2013.01); *B60T 8/1703* (2013.01); *B64C 25/34* (2013.01); *F16D 55/36* (2013.01); *B32B 2307/304* (2013.01); *B32B 2605/18* (2013.01); *F16D 65/186* (2013.01); *F16D 65/847* (2013.01); *F16D 2065/785* (2013.01); *F16D 2200/0078* (2013.01)

(58) Field of Classification Search
CPC ... F16D 55/36; F16D 2065/785; B60C 23/18; B60C 23/19; B32B 2307/304; B64C 25/42

See application file for complete search history.

(56) References Cited

U.S. PATENT DOCUMENTS

| | | | | |
|---|---|---|---|---|
| 3,151,712 | A | * 10/1964 | Jackson | .................... B64C 1/38 |
| | | | | 428/174 |
| 4,703,159 | A | * 10/1987 | Blair | ...................... B23K 20/16 |
| | | | | 219/78.12 |
| 4,925,134 | A | 5/1990 | Keller et al. | |

(Continued)

FOREIGN PATENT DOCUMENTS

| | | |
|---|---|---|
| EP | 1304240 | 4/2003 |
| EP | 3159571 | 4/2017 |

OTHER PUBLICATIONS

European Patent Office, European Search Report dated Jun. 21, 2019 in Application No. 19154439.4.

*Primary Examiner* — Nicholas J Lane
(74) *Attorney, Agent, or Firm* — Snell & Wilmer L.L.P.

(57) ABSTRACT

A laminated dimpled foil metallic heat shield may have a cylindrical structure with an outer diameter and an inner diameter comprising a first metallic layer defining the outer diameter, an inboard edge and an outboard edge of the laminated dimpled foil metallic heat shield assembly, a second metallic layer defining the inner diameter of the laminated dimpled foil metallic heat shield assembly, and a first dimpled foil layer extending about a first circumference between the inner diameter and the outer diameter.

17 Claims, 7 Drawing Sheets

(56) References Cited

U.S. PATENT DOCUMENTS

| | | | | |
|---|---|---|---|---|
| 5,002,342 A | * | 3/1991 | Dyko | B60C 23/18 |
| | | | | 188/264 G |
| 5,199,536 A | * | 4/1993 | Clark | F16D 55/36 |
| | | | | 188/264 G |
| 5,851,056 A | | 12/1998 | Hyde | |
| 5,958,603 A | | 9/1999 | Ragland et al. | |
| 6,419,056 B1 | * | 7/2002 | Dyko | B64C 25/36 |
| | | | | 188/264 A |
| 7,546,910 B2 | | 6/2009 | Thorp et al. | |
| 2003/0102710 A1 | * | 6/2003 | Thorp | F16D 55/36 |
| | | | | 301/6.1 |
| 2017/0106973 A1 | * | 4/2017 | Baden | B64C 25/36 |
| 2017/0363162 A1 | * | 12/2017 | Whittle | F16D 65/128 |

* cited by examiner

LAMINATED DIMPLED FOIL METALLIC HEAT SHIELD

FIELD

The disclosure relates generally to aircraft brake systems and aircraft brake component heat shields.

BACKGROUND

Aircraft often include one or more landing gear that comprise one or more wheels. A braking system is coupled to the wheel(s) in order to decelerate or park the aircraft. Aircraft braking on landing tends to generate significant heat which tends to damage unprotected landing gear system components. A heat shield tends to protect landing gear system components from the heat of braking but the heat of braking tends to degrade the heat shield over many cycles of use lending to periodic replacement and disposal of the heat shield. Heat shields often comprise hazardous heat resistant materials which tend to complicate disposal.

SUMMARY

In various embodiments the present disclosure provides a laminated dimpled foil metallic heat shield may have a cylindrical structure with an outer diameter and an inner diameter comprising a first metallic layer defining the outer diameter, an inboard edge and an outboard edge of the laminated dimpled foil metallic heat shield assembly, a second metallic layer defining the inner diameter of the laminated dimpled foil metallic heat shield assembly, and a first dimpled foil layer extending about a first circumference between the inner diameter and the outer diameter.

In various embodiments, the first dimpled foil layer comprises a plane of metallic material having a plurality of dimples raised at least one of above or below the plane of metallic material. In various embodiments, a second dimpled foil layer extending about a second circumference between the inner diameter and the outer diameter. In various embodiments, a second dimpled foil layer extending about a second circumference between the inner diameter and the outer diameter. In various embodiments, a torque bar spacer extending radially through the inner diameter and the outer diameter. In various embodiments, a chin ring may be coupled about at the inboard edge. In various embodiments, a stud may extend radially outward from the first metallic layer. In various embodiments, the torque bar spacer comprises a first mounting feature and a second mounting feature, wherein the first mounting feature is configured to interface the laminated dimpled foil metallic heat shield to a rim of a wheel, wherein the second mounting feature provides a coupling interface between the chin ring and the inboard edge. In various embodiments, the torque bar spacer is configured to provide a first standoff distance between the rim of the wheel and the outer diameter of the laminated dimpled foil metallic heat shield and configured to provide a second standoff distance between the inner diameter of the laminated dimpled foil metallic heat shield assembly and a torque bar coupled to the torque bar spacer. In various embodiments, a laminated dimpled foil metallic heat shield assembly comprises at least one of steel, stainless steel, titanium, titanium alloy, aluminum, or aluminum alloy.

In various embodiments, the present disclosure provides a brake assembly for mounting on an axle comprising a brake rotor, a wheel comprising a wheel disk and a hub and having an outboard lip and an inboard lip defining a rim about the wheel disk extending axially with respect to the hub, and a a laminated dimpled foil metallic heat shield having a cylindrical structure with an outer diameter and an inner diameter comprising a first metallic layer defining the outer diameter, an inboard edge, and an outboard edge of the laminated dimpled foil metallic heat shield, second metallic layer extending defining the inner diameter of the laminated dimpled foil metallic heat shield, and a first dimpled foil layer extending about a first circumference between the inner diameter and the outer diameter.

In various embodiments, the laminated dimpled foil metallic heat shield extends along an axis of the hub between the wheel disk and the inboard lip, wherein the first metallic layer is proximate the rim and the second metallic layer is proximate the brake rotor. In various embodiments, the first dimpled foil layer comprises a plane of metallic material having a plurality of dimples raised at least one of above or below the plane of metallic material. In various embodiments, a second dimpled foil layer extends about a second circumference between the inner diameter and the outer diameter. In various embodiments, the first metallic layer and the second metallic layer are joined about the inboard edge and about the outboard edge. In various embodiments, a torque bar spacer extends radially through the inner diameter and the outer diameter. In various embodiments, a chin ring may be coupled at the inboard edge. In various embodiments, the torque bar spacer comprises a first mounting feature and a second mounting feature, wherein the first mounting feature interfaces the laminated dimpled foil metallic heat shield to the rim of the wheel, wherein the second mounting feature provides a coupling interface between the chin ring and the inboard edge. In various embodiments, the torque bar spacer provides a first standoff distance between the rim of the wheel and the outer diameter of the laminated dimpled foil metallic heat shield and a second standoff distance between the inner diameter of the laminated dimpled foil metallic heat shield and a torque bar coupled to the torque bar spacer at a first end of the torque bar proximate the outboard lip, wherein the torque bar is coupled to the wheel disk at a second end of the torque bar, wherein the torque bar is coupled to the brake rotor.

In various embodiments, the present disclosure provides a method of manufacturing a laminated dimpled foil metallic heat shield, the method comprising shaping a first metallic layer, a second metallic layer, and a first dimpled foil layer into a cylindrical structure having the first dimpled foil layer between the first metallic layer and the second metallic layer, and coupling the first metallic layer and the second metallic layer an edge of the first metallic layer and the second metallic layer.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosures, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosures, it should be understood that other embodiments may be realized and that logical, chemical, and mechanical changes may be made without departing from the spirit and scope of the disclosures. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Figure 1A:
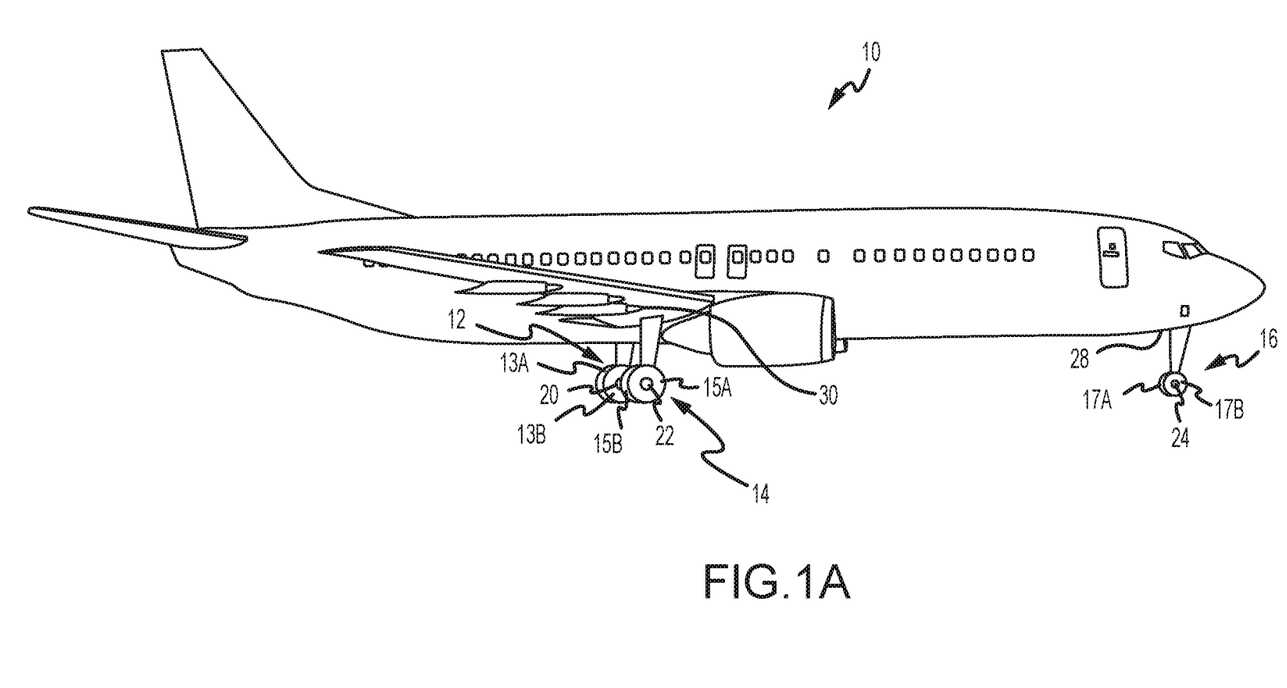
FIG. 1A illustrates an aircraft having a brake system comprising a laminated dimpled foil metallic heat shield, in accordance with various embodiments.

Referring now to FIG. 1A, in accordance with various embodiments, an aircraft 10 includes landing gear, such as a left main landing gear 12, a right main landing gear 14, and nose landing gear 16. The left main landing gear 12, right main landing gear 14, and nose landing gear 16 typically support the aircraft 10 when the aircraft 10 is not flying, thereby allowing the aircraft 10 to taxi, take off, and land without damage. In various embodiments, the left main landing gear 12 includes a first wheel 13A and a second wheel 13B coupled by an axle 20. In various embodiments, the right main landing gear 14 includes a first wheel 15A and a second wheel 15B coupled by an axle 22. In various embodiments, the nose landing gear 16 includes a first nose wheel 17A and a second nose wheel 17B coupled by an axle 24. In various embodiments, the aircraft 10 comprises any number of landing gear(s), and each landing gear comprises any number of wheels. In various embodiments, the left main landing gear 12, right main landing gear 14, and nose landing gear 16 are retracted when the aircraft 10 is in flight. In various embodiments, one or more of the left main landing gear 12, right main landing gear 14, and nose landing gear 16 extends from an underside of a fuselage 28 of the aircraft 10, or from an underside of the wings 30 thereof.

In various embodiments, the aircraft 10 also includes a brake system that is applied to one or more of the wheels 13A, 13B, 15A, 15B, 17A, 17B of one or more of the respective left main landing gear 12, right main landing gear 14, and/or nose landing gear 16. Such brake systems of the aircraft 10 typically comprise a collection of assemblies, subsystems, and/or units that produce output signals for controlling the braking force and/or torque applied at one or more of the wheels 13A, 13B, 15A, 15B, 17A, 17B. Such brake systems typically communicate with the brakes of the left main landing gear 12, right main landing gear 14, and/or nose landing gear 16, and each brake is typically mounted to each wheel 13A, 13B, 15A, 15B, 17A, 17B in order to apply and release braking forces thereon. In various embodiments, the brakes of the aircraft 10 further include a non-rotatable wheel support, the wheels 13A, 13B, 15A, 15B, 17A, 17B mounted to the wheel support for rotation, and a brake disk stack.

Figure 1B:
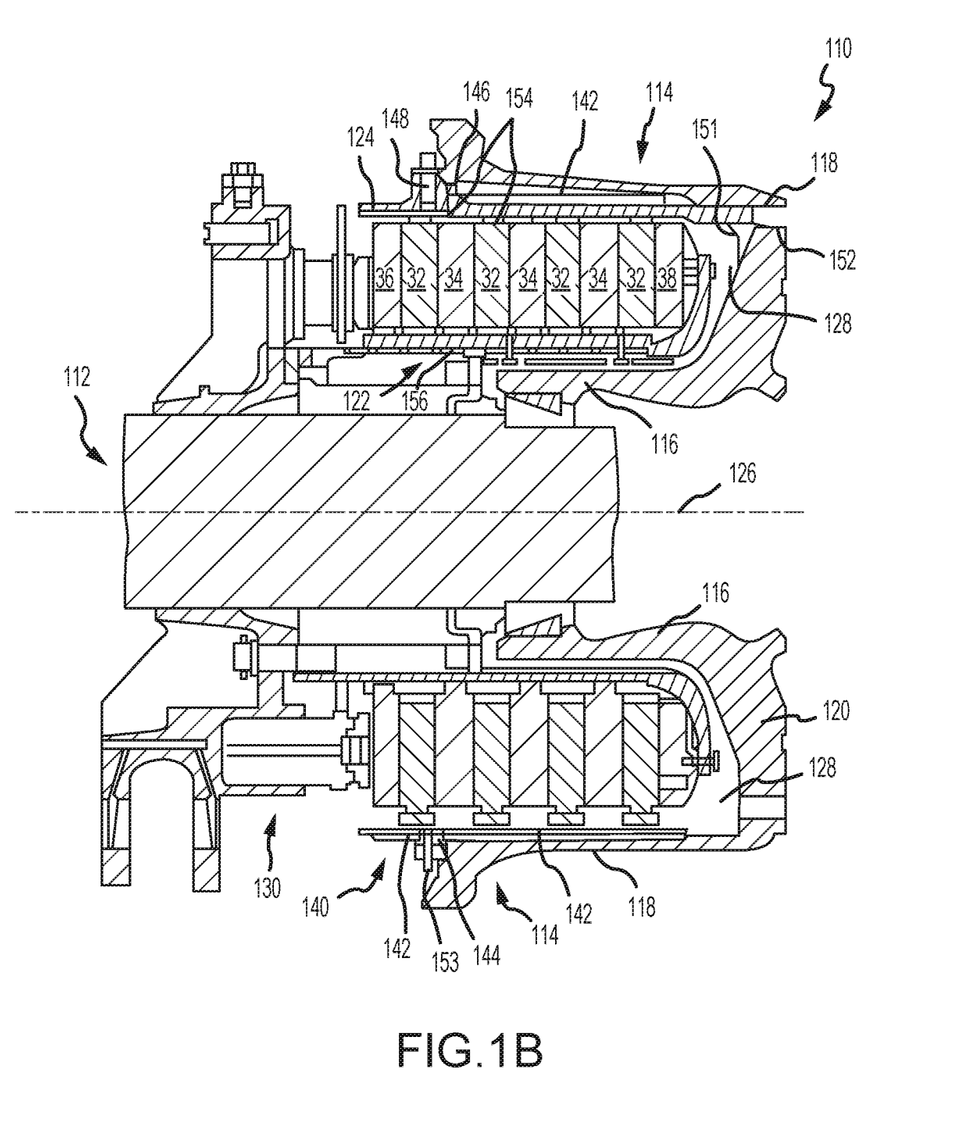
FIG. 1B illustrates a brake assembly for mounting on an axle comprising a laminated dimpled foil metallic heat shield, in accordance with various embodiments.

Referring now to FIG. 1B, a brake assembly for mounting on an axle 110 comprising a laminated dimpled foil metallic heat shield 140 is located on the aircraft 10 of FIG. 1-A, in accordance with various embodiments. The brake assembly for mounting on an axle 110 typically comprises a bogie axle 112, a wheel 114 (e.g., the wheels 13A, 13B, 15A, 15B, 17A, 17B of FIG. 1-A) including a hub 116 and wheel well 118, a web 120, a torque take-out assembly 122, one or more torque bars 124, a wheel rotational axis 126, a wheel well recess 128, an actuator 130, multiple brake rotors 32, multiple brake stators 34, a pressure plate 36, an end plate 38, a laminated dimpled foil metallic heat shield 140 which may have sections 142, multiple heat shield carriers 144, an air gap 146, multiple torque bar bolts 148, a torque bar pin 151, a wheel web hole 152, multiple heat shield fasteners 153, multiple rotor lugs 154, and multiple stator slots 156.

Brake disks (e.g., the interleaved brake rotors 32 and brake stators 34) are disposed in the wheel well recess 128 of the wheel well 118. The brake rotors 32 are typically secured to the torque bars 124 for rotating with the wheel 114, while the brake stators 34 are typically engaged with the torque take-out assembly 122. At least one actuator 130 is typically operable to compress the interleaved brake rotors 32 and brake stators 34 for stopping the aircraft 10 of FIG. 1A. In the embodiment of FIG. 1B, the actuator 130 is shown as a hydraulically actuated piston. The pressure plate 36 and end plate 38 are disposed at opposite ends of the interleaved brake rotors 32 and brake stators 34.

Through compression of the brake rotors 32 and brake stators 34 between the pressure plate 36 and end plate 38, the resulting frictional contact slows, stops, and/or prevents rotation of the wheel 114. The torque take-out assembly 122 is typically secured to a stationary portion of a landing gear truck, such as a bogie beam or other landing gear strut, such that the torque take-out assembly 122 and brake stators 34 are prevented from rotating during braking of the aircraft 10 of FIG. 1A. The brake rotors 32 and brake stators 34 are typically fabricated from various materials, such as, for example carbon materials. The brake disks typically withstand and dissipate the heat generated from contact between the brake disks while braking the aircraft 10 of FIG. 1A.

Figure 2:
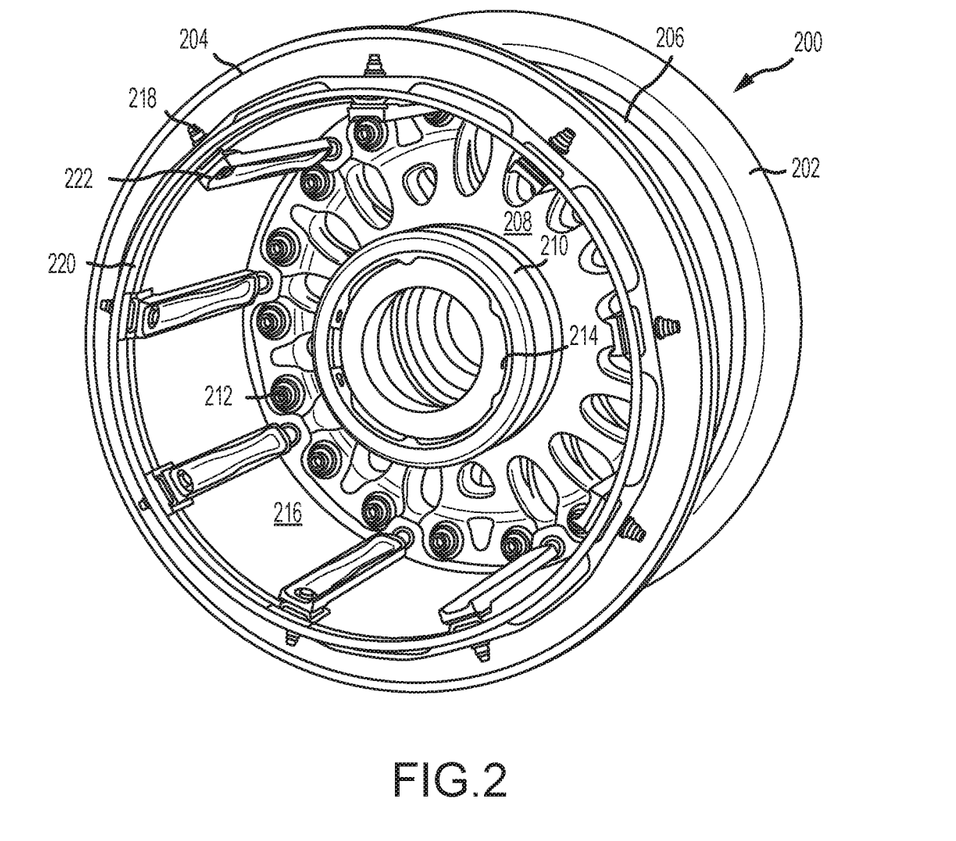
FIG. 2 illustrates a wheel having a laminated dimpled foil metallic heat shield, in accordance with various embodiments.

According to various embodiments and with reference to FIGS. 1 and 2, a wheel 200 having a laminated dimpled foil metallic heat shield is provided. Wheel 200 comprises an outboard lip 202, coupled to a wheel disk 208 by wheel tie bolts 212, and an inboard lip 204 defining a rim 206 about the wheel disk 208. A hub 210 is centered through wheel disk 208 and may comprise bearings 214. The rim 206 extends axially with respect to the hub 210 about the circumference of wheel disk 208. A laminated dimpled foil metallic heat shield 216 lies radially inward of rim 206 between inboard lip 204 and wheel disk 208 of wheel 200. Laminated dimpled foil metallic heat shield 216 comprises a cylindrical structure extending circumferentially about the axis of hub 210 around the inner diameter of rim 206. In various embodiments, laminated dimpled foil metallic heat shield 216 may be coupled proximate rim 206 by fasteners 218 and may be held proximate rim 206, with chin ring 220 proximate inboard lip 204, by an interference between laminated dimpled foil metallic heat shield 216 and torque bar 222. In various embodiments, torque bar 222 may be coupled to wheel disk 208 at an outboard end and may be coupled to laminated dimpled foil metallic heat shield 216 at an inboard end proximate chin ring 220 by fasteners 218.

Figure 3:
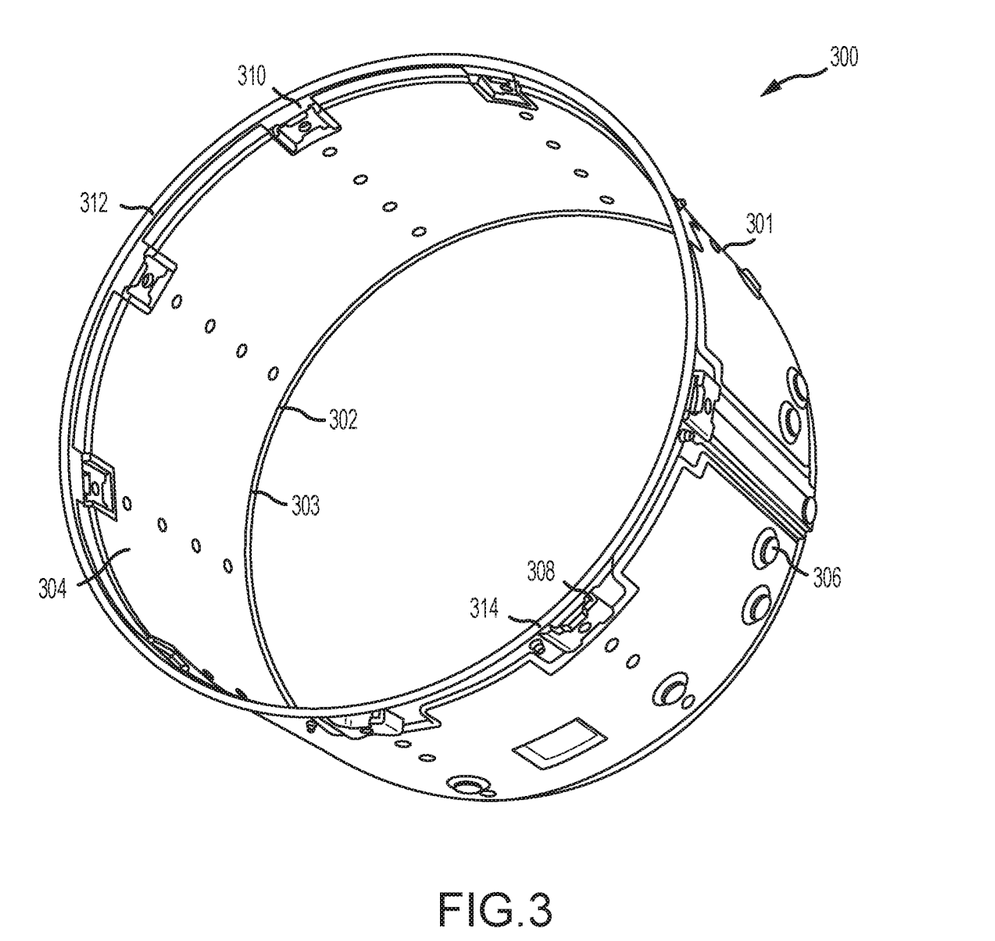
FIG. 3 illustrates a laminated dimpled foil metallic heat shield, in accordance with various embodiments.

With reference now to FIG. 3, in various embodiments, a laminated dimpled foil metallic heat shield 300 is provided. Laminated dimpled foil metallic heat shield 300 comprises outer diameter 301, outboard edge 302, inner diameter 303, and inboard edge 304. A chin ring 312 is coupled about inboard edge 304. In various embodiments, torque bar spacers 308 comprising first mounting features 310 extend radially through the inner diameter 303 and outer diameter 301. In various embodiments, a plurality of torque bar spacers 308 corresponding to a plurality of torque bars such as torque bars 222 may be arrayed circumferentially about inboard edge 304 proximate chin ring 312. In various embodiments, a torque bar spacer 308 may provide a single point of contact and a standoff distance between laminated dimpled foil metallic heat shield 300 and a torque bar such as torque bar 222 and, in that regard, a torque bar spacer may tend to limit conductive heat transfer between the torque bar and the laminated dimpled foil metallic heat shield. In various embodiments, the first mounting feature 310 may couple laminated dimpled foil metallic heat shield 300 to a rim such as rim 206 and may interface with a rim proximate an inboard lip such as inboard lip 204. In various embodiments, torque bar spacers 308 may comprise a second mounting feature 314 which provides a coupling interface between chin ring 312 and inboard edge 304. In various embodiments, studs 306 may be coupled to and extend a distance radially outward of outer diameter 301 to provide a standoff distance between laminated dimpled foil metallic heat shield 300 and a rim such as rim 206.

In various embodiments, the thickness of a laminated dimpled foil metallic heat shield may be between 0.005 inches [0.127 mm] and 1.5 inches [38.1 mm], or between 0.05 inch [1.27 mm] and 1.0 inches [25.4 mm], or between 0.1 inches [2.54 mm] and 0.5 inches [12.7 mm]. In various embodiments, the length of a laminated dimpled foil metallic heat shield may be defined by the axial length of a wheel, such as between an inboard lip and a wheel disk. In various embodiments a laminated dimpled foil metallic heat shield may be made of steel, stainless steel, titanium, titanium alloy, aluminum, aluminum alloy, or may be a surface treated metal or metal alloy.

Figure 4A:
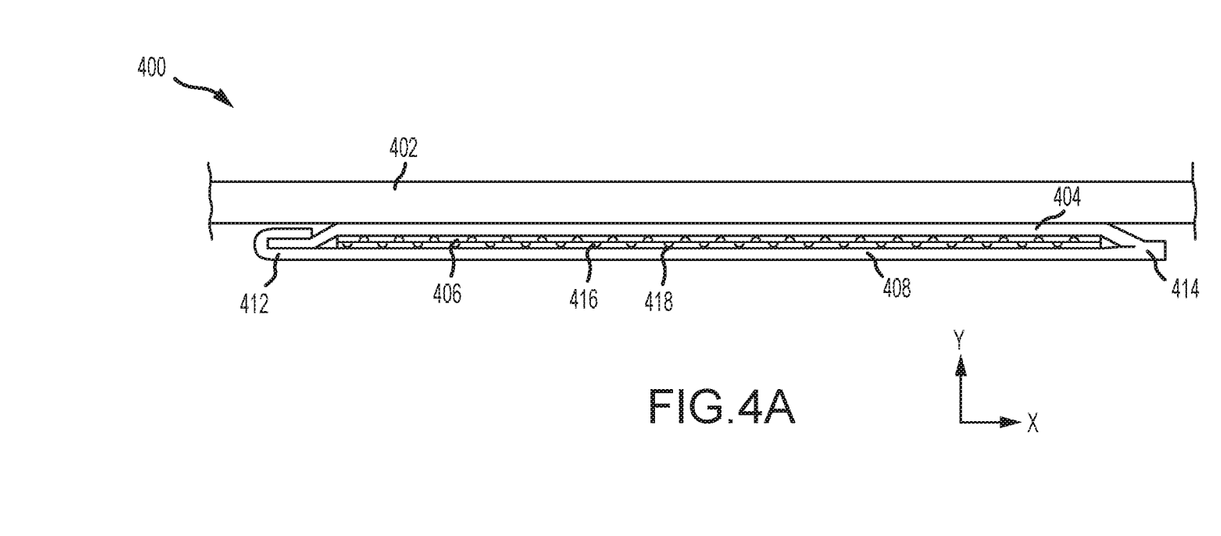
FIG. 4A illustrates a section through a laminated dimpled foil metallic heat shield, in accordance with various embodiments.

In various embodiments and with reference now to FIG. 4A, a laminated dimpled foil metallic heat shield 400 comprises various features, materials, geometries, construction, manufacturing techniques, and/or internal components similar to laminated dimpled foil metallic heat shield 300 and is shown comprising alternating metallic and foil layers extending radially inward (along the Y-axis) from the inner diameter of heat sensitive structure 402 and axially (along the X-axis) and extends circumferentially about an inner diameter of heat sensitive structure 402. A first metallic layer 404 is coupled to a first dimpled foil layer 406 and to the inner diameter of heat sensitive structure 402. Second metallic layer 408 is coupled first dimpled foil layer 406. In various embodiments, the edges of first metallic layer 404 and second metallic layer 408 may extend (along the X-axis) a distance beyond the first dimpled foil layer 406 and be joined, such as by welding 414, or by crimping 412. In this regard, first dimpled foil layer 406 may tend to be sandwiched between first metallic layer 404 and second metallic layer 408. In various embodiments, one or more metallic layers, such as first metallic layer 404 and second metallic layer 408, may be surface treated to increase thermal reflectivity or hardness.

Figure 4B:
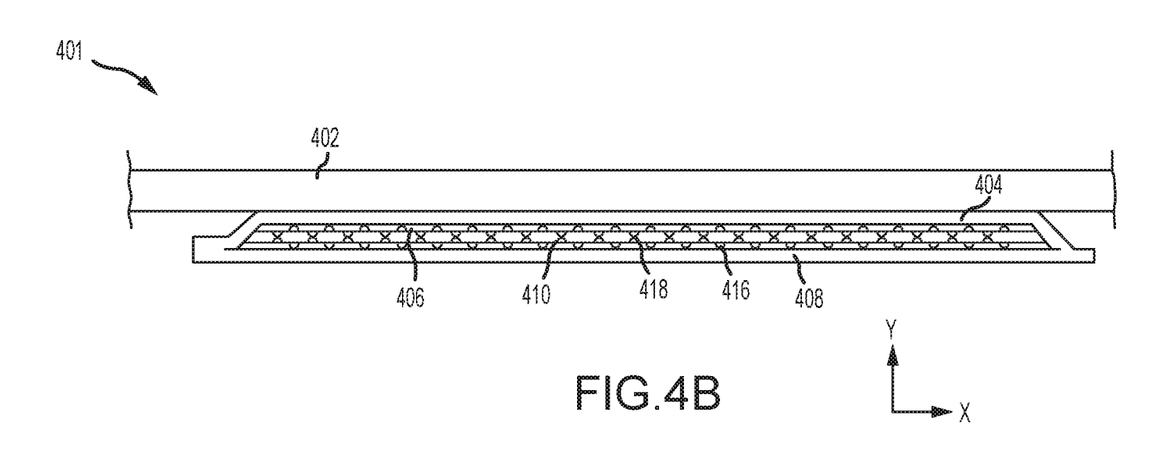
FIG. 4B illustrates a section through a laminated dimpled foil metallic heat shield, in accordance with various embodiments.

In various embodiments and with reference now to FIG. 4B, a laminated dimpled foil metallic heat shield 401 is shown comprising features, materials, geometries, components, and manufacturing techniques similar to lamented dimpled foil metallic heat shield 400. Laminated dimpled foil metallic heat shield 401 comprises alternating metallic and foil layers extending radially inward (along the Y-axis) from the inner diameter of heat sensitive structure 402 and axially (along the X-axis) and extends circumferentially about the inner diameter of heat sensitive structure 402. A first metallic layer 404 is coupled to a first dimpled foil layer 406 and to the inner diameter of heat sensitive structure 402. A second dimpled foil layer 410 is coupled radially inward of the first dimpled foil layer. Second metallic layer 408 is coupled radially inward of the second dimpled foil layer 410, tending to sandwich first dimpled foil layer 406 and second dimpled foil layer 410 between first metallic layer 404 and second metallic layer 408.

In various embodiments, a dimpled foil layer such as first dimpled foil layer 406 and second dimpled foil layer 410 may comprise a plane of metallic material having a plurality of dimples (416) raised at least one of above or below the plane of metallic material. In this regard, the plane of a dimpled foil layer may be suspended between a first metallic layer, such as first metallic layer 404, and a second metallic layer, such as second metallic layer 408, with the points of contact between the dimpled foil layer and the metallic layers (such as 404, 408) being at a surface (418) of a dimple. In this regard, a dimpled foil layer may tend to reduce conductive heat transfer between the metallic layers, may tend to reduce convective heat transfer by tending to segregate air spaces between the metallic layers, and may tend to reduce radiative heat transfer between the metallic layers. In this regard, a laminated dimpled foil metallic heat shield may tend to reduce radiative transfer of heat to from brake rotor or a brake stator (e.g., 32, 34, 36, and 38 of FIG. 1) to a heat sensitive structure. In various embodiments, the dimples of two or more dimpled foil layers may be configured to inhibit nesting or stacking of dimples which may tend to increase a contact area between the dimpled foil layers or tend to allow contact between the planes of the dimpled foil layers. In various embodiments a plurality of dimples may define about a 1 in (25.4 mm)±0.5 in (12.7) grid between dimples. In various embodiments the diameter of each of the plurality of dimples may be 0.2 in (5.08 mm)±0.15 in (3.81 mm).

Figure 5:
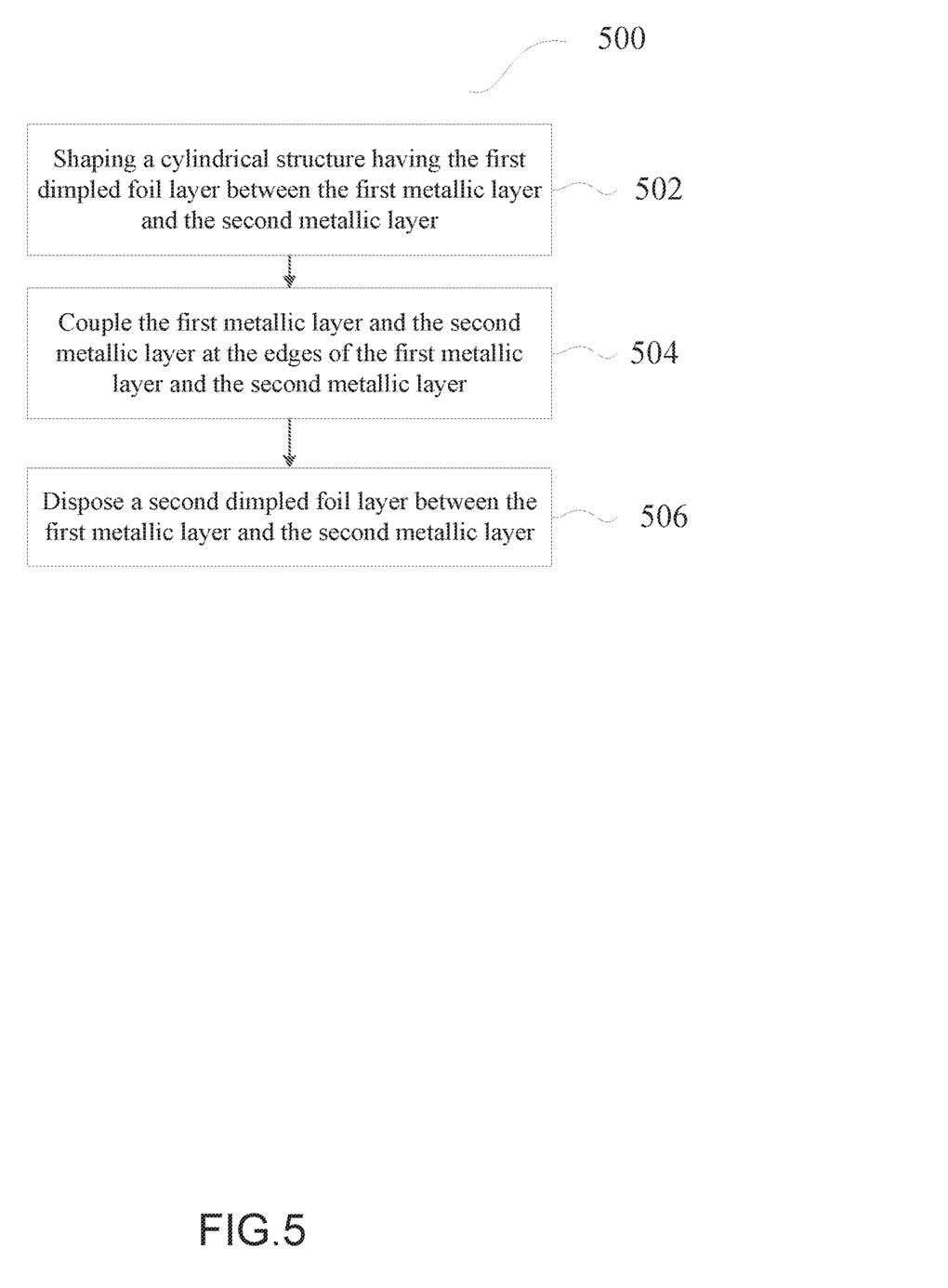
FIG. 5 illustrates a method of manufacturing a foil laminated dimpled metallic heat shield, in accordance with various embodiments.

In various embodiments and with reference now to FIG. 5, a method 500 of manufacturing a laminated dimpled foil metallic heat shield may comprise shaping a first metallic layer, a second metallic layer, and a first dimpled foil layer into a cylindrical structure (step 502) having the first dimpled foil layer between the first metallic layer and the second metallic layer; coupling the first metallic layer and the second metallic layer (step 504) at the edges of the first metallic layer and the second metallic layer such as, for example, by welding or crimping. In various embodiments, the method may further comprise disposing a second dimpled foil layer between the first metallic layer and the second metallic layer (step 506). In various embodiments, the laminated dimpled foil metallic heat shield may be coupled at an inner diameter of a heat sensitive structure.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures.

The scope of the disclosures is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiment Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A laminated dimpled foil metallic heat shield assembly having a cylindrical structure with an outer diameter and an inner diameter, comprising:
   a first metallic layer defining the outer diameter, an inboard edge and an outboard edge of the laminated dimpled foil metallic heat shield assembly;
   a second metallic layer defining the inner diameter of the laminated dimpled foil metallic heat shield assembly; and
   a first dimpled foil layer extending about a first circumference between the inner diameter and the outer diameter,
   wherein the first dimpled foil layer comprises a first plane of metallic material having a first plurality of dimples raised above and below the first plane of metallic material; and
   a second dimpled foil layer extending about a second circumference between the inner diameter and the outer diameter,
   wherein the second dimpled foil layer comprises a second plane of metallic material having a second plurality of dimples raised above and below the second plane of metallic material,
   wherein the first plurality of dimples of the first dimpled foil layer and the second plurality of dimples of the second dimpled foil layer are configured to inhibit nesting such that the dimples below the first plane of metallic material of the first dimpled foil layer contact the dimples above the second plane of metallic material proximate the apex of the respective dimples, and
   wherein each dimple of the first plurality of dimples is segregated by a planar portion of the first plane of first plane of metallic material.

2. The laminated dimpled foil metallic heat shield of claim 1, wherein each of the first metallic layer and the second metallic layer are surface treated to increase thermal reflectivity.

3. The laminated dimpled foil metallic heat shield of claim 1, wherein the first metallic layer and the second metallic layer are joined about the inboard edge and about the outboard edge.

4. The laminated dimpled foil metallic heat shield of claim 1, further comprising a torque bar spacer extending radially through the inner diameter and the outer diameter.

5. The laminated dimpled foil metallic heat shield of claim 4, further comprising a chin ring coupled at the inboard edge.

6. The laminated dimpled foil metallic heat shield assembly of claim 5, further comprising a stud extending radially outward from the first metallic layer.

7. The laminated dimpled foil metallic heat shield of claim 5, wherein the torque bar spacer comprises a first mounting feature and a second mounting feature, wherein the first mounting feature is configured to interface the laminated dimpled foil metallic heat shield to a rim of a wheel, wherein the second mounting feature provides a coupling interface between the chin ring and the inboard edge.

8. The laminated dimpled foil metallic heat shield assembly of claim 7, wherein the torque bar spacer is configured to provide a first standoff distance between the rim of the wheel and the outer diameter of the laminated dimpled foil metallic heat shield and configured to provide a second standoff distance between the inner diameter of the laminated dimpled foil metallic heat shield assembly and a torque bar coupled to the torque bar spacer.

9. The laminated dimpled foil metallic heat shield of claim 1, further comprising at least one of steel, stainless steel, titanium, titanium alloy, aluminum, or aluminum alloy.

10. A brake assembly for mounting on an axle comprising:
a brake rotor;
a wheel comprising a wheel disk and a hub, and having an outboard lip and an inboard lip defining a rim about the wheel disk extending axially with respect to the hub, wherein the wheel disk is coupled to the outboard lip; and
a laminated dimpled foil metallic heat shield having a cylindrical structure with an outer diameter and an inner diameter, comprising:
a first metallic layer defining the outer diameter, an inboard edge, and an outboard edge of the laminated dimpled foil metallic heat shield;
a second metallic layer extending defining the inner diameter of the laminated dimpled foil metallic heat shield; and
a first dimpled foil layer extending about a first circumference between the inner diameter and the outer diameter,
wherein the first dimpled foil layer comprises a first plane of metallic material having a first plurality of dimples raised above and below the first plane of metallic material; and
a second dimpled foil layer extending about a second circumference between the inner diameter and the outer diameter,
wherein the second dimpled foil layer comprises a second plane of metallic material having a second plurality of dimples raised above and below the second plane of metallic material,
wherein the first plurality of dimples of the first dimpled foil layer and the second plurality of dimples of the second dimpled foil layer are configured to inhibit nesting such that the dimples below the first plane of metallic material of the first dimpled foil layer contact the dimples above the second plane of metallic material proximate the apex of the respective dimples, and
wherein each dimple of the first plurality of dimples is segregated by a planar portion of the first plane of first plane of metallic material.

11. The brake assembly of claim 10, wherein the laminated dimpled foil metallic heat shield extends along an axis of the hub between the wheel disk and the inboard lip, wherein the first metallic layer is proximate the rim and the second metallic layer is proximate the brake rotor.

12. The brake assembly of claim 10, wherein the first metallic layer and the second metallic layer are joined about the inboard edge and about the outboard edge.

13. The brake assembly of claim 10, wherein the laminated dimpled foil metallic heat shield further comprises a torque bar spacer extending radially through the inner diameter and the outer diameter.

14. The brake assembly of claim 13, wherein the laminated dimpled foil metallic heat shield further comprises a chin ring coupled at the inboard edge.

15. The brake assembly of claim 14, wherein the torque bar spacer comprises a first mounting feature and a second mounting feature, wherein the first mounting feature interfaces the laminated dimpled foil metallic heat shield to the rim of the wheel, wherein the second mounting feature provides a coupling interface between the chin ring and the inboard edge.

16. The brake assembly of claim 15, wherein the torque bar spacer provides a first standoff distance between the rim of the wheel and the outer diameter of the laminated dimpled foil metallic heat shield and a second standoff distance between the inner diameter of the laminated dimpled foil metallic heat shield and a torque bar coupled to the torque bar spacer at a first end of the torque bar proximate the inboard lip, wherein the torque bar is coupled to the wheel disk at a second end of the torque bar, wherein the torque bar is coupled to the brake rotor.

17. A method of manufacturing a laminated dimpled foil metallic heat shield, the method comprising:
shaping a first metallic layer, a second metallic layer, a first dimpled foil layer, and a second dimpled foil layer, into a cylindrical structure having the first dimpled foil layer between the first metallic layer and the second metallic layer; and
coupling the first metallic layer and the second metallic layer at an edge of the first metallic layer and the second metallic layer, wherein
wherein the first dimpled foil layer comprises a first plane of metallic material having a first plurality of dimples raised above and below the first plane of metallic material,
wherein the second dimpled foil layer comprises a second plane of metallic material having a second plurality of dimples raised above and below the second plane of metallic material, and
wherein the first plurality of dimples of the first dimpled foil layer and the second plurality of dimples of the second dimpled foil layer are configured to inhibit nesting such that the dimples below the first plane of metallic material of the first dimpled foil layer contact the dimples above the second plane of metallic material proximate the apex of the respective dimples, and
wherein each dimple of the first plurality of dimples is segregated by a planar portion of the first plane of first plane of metallic material.

* * * * *